(12) United States Patent
Wong

(10) Patent No.: US 7,835,516 B2
(45) Date of Patent: Nov. 16, 2010

(54) DIRECT ACCESS ARRANGEMENT DEVICE

(75) Inventor: Jack Wong, Mississauga (CA)

(73) Assignee: Tyco Safety Products Canada Ltd., Concord, Ontario (CA)

( * ) Notice: Subject to any disclaimer, the term of this patent is extended or adjusted under 35 U.S.C. 154(b) by 1357 days.

(21) Appl. No.: 11/321,262

(22) Filed: Dec. 29, 2005

(65) Prior Publication Data

US 2007/0154010 A1 Jul. 5, 2007

(51) Int. Cl.
H04M 7/04 (2006.01)
(52) U.S. Cl. .................. 379/398; 379/387.01
(58) Field of Classification Search ............. 379/93.01, 379/93.05, 93.06, 387.01, 399.01
See application file for complete search history.

(56) References Cited

U.S. PATENT DOCUMENTS

| 4,203,006 A | 5/1980 | Mascia |
| 4,807,278 A | 2/1989 | Ross |
| 5,291,545 A | 3/1994 | Stahl |
| 5,422,939 A | 6/1995 | Kramer et al. |
| 5,546,050 A * | 8/1996 | Florian et al. ............... 330/282 |
| 6,005,923 A | 12/1999 | Lee |
| 6,272,220 B1 * | 8/2001 | Kincaid ................. 379/399.01 |
| 6,516,024 B1 | 2/2003 | Dupuis et al. |
| 7,142,641 B2 * | 11/2006 | Hinkson et al. ............... 379/37 |

FOREIGN PATENT DOCUMENTS

| EP | 0 338654 | 10/1989 |
| EP | 0338654 | 10/1989 |
| WO | WO 97/23985 | 7/1997 |
| WO | WO 02/093878 | 11/2002 |
| WO | WO02/103989 | 12/2002 |
| WO | WO 02/103989 | 12/2002 |

* cited by examiner

Primary Examiner—Walter F Briney, III
(74) Attorney, Agent, or Firm—The Small Patent Law Group

(57) ABSTRACT

A direct access arrangement (DAA) device configured to interface a security alarm modem with a phone network. The DAA device comprises a receive optical isolator (OI) module and first and second transmit OI modules. The transmit OI modules are joined in parallel with one another to receive signals from the security alarm modem and convey the signals to the phone network. The receive IO and first and second transmit OI modules may each be interconnected to at least partially cancel distortion generated by the first and second transmit IO modules.

21 Claims, 6 Drawing Sheets

DIRECT ACCESS ARRANGEMENT DEVICE

BACKGROUND OF THE INVENTION

This invention relates generally to a device that interfaces communications network enabled systems with a phone network, and more specifically to an improved direct access arrangement device interconnecting equipment with a phone network.

One example of a data communications network enabled system is a security alarm system. Security alarm systems are utilized in a variety of applications in both residential and commercial environments. Security alarms monitor one or more remote components and, based upon feedback from the remote components, carry out various security and emergency related functions. Security alarm systems typically communicate with one or more remote terminals, such as at a host or central operations terminal, over conventional phone lines maintained within the phone network.

Security alarm systems generally include an alarm panel joined to a modem that provides bidirectional communication over the phone network. The modem conveys security and emergency related data at various connection speeds (e.g. 2400 bps) between the phone network and the security panel. Each phone network operates with a standardized profile for parameters such as line input and output levels, signal attenuation, line impedance and the like. One example of an average US line profile is a line impedance of 600 ohms, a line output level of approximately −23.5 dBm, a line input level of −10 dBm, and a line attenuation of 13.5 dBm. The communication of alarm signals from residential and commercial security alarm systems is typically accomplished using an integrated modem in a security system alarm panel to modulate the signal for transmission over a phone line. Many past and current systems use low bandwidth communications channels. However, due to advancing technology and new features in modern security systems, it has become desirable for some systems to support a higher bandwidth communication channel. As a result, a need exists to improve the on-board modem hardware to achieve better levels of signal integrity. The security device industry is sensitive to product component cost which limits the use of integrated solutions that might otherwise offer higher performance.

Direct Access Arrangement (DAA) devices are used in certain fields, other than security alarm systems, to interface other types of equipment with the phone network. For example, a DAA device may be utilized to terminate a telephone connection at an end user's home phone. In addition, DAA devices have been used with modems to connect personal computers to the phone network.

However, conventional designs for DAA devices are quite limited. Conventional DAA devices utilize a transformer or an optical isolator to isolate the phone network from the end user's phone or PC. Alternative convention implementations involve using a transformer-based DAA or an integrated DAA chip. An integrated DAA chip utilizes high quality optical isolators or a capacitor isolated common-mode barrier, both solutions of which are costly. While transformers are useful in more demanding applications, transformers may become cost prohibitive in certain applications. Optical isolators are more cost effective than transformers. However, optical isolators in general introduce high levels of signal distortion. Security alarm systems have relatively stringent signal distortion requirements. Consequently, the high levels of signal distortion potentially introduced by optical isolators have limited the use of DAA devices with optical isolators in security alarm systems. Conventional DAA devices were generally designed for 300 bits per second (bps) modem operations. Modems that operate at data rates of 300 bps do not experience overly high levels of signal distortion and are relatively tolerant of signal distortion. Thus, signal distortion is not a large concern.

Conventional DAA devices do not adequately account for signal distortion to be used in security alarm systems. Signal distortion may manifest itself as carrier jitter. Consequently, an amount of distortion that creates no problems for low baud rate applications becomes quite problematic for higher baud rate applications due, in part, to the increased amount of jitter. Unlike transmission echo, distortion is not canceled by the telephone device within the phone network, nor by linear filters within the modem.

One purpose of the optical isolator is to transfer electrical signals across an optical path in order to isolate from one another both sides of the electrical device. Optical isolator blocks common mode electrical signals, thereby leaving differential mode electrical signals that are coupled through an optical path. A net result is a transfer of electrical current. A parameter that defines the ratio between the input and output current is known as the current transfer ratio. Low cost optical isolators, such as the LTV-816S-TA1-DSC, are inherently non-linear. Typically, the current transfer ratio is not constant and ranges (e.g. from 0.7 to 1.6 at an input current level of 1 mA to 16 mA). The non-constant current transfer ratio creates the non-linearity exhibited by the optical isolator.

A need remains for an improved DAA device that may be constructed in a relatively cost effective manner while maintaining low signal distortion.

BRIEF DESCRIPTION OF THE INVENTION

In accordance with at least one embodiment, a direct access arrangement (DAA) device is provided that is configured to interface a modem with a phone network. The DAA device comprises a receive optical isolator (OI) module having a receive input side and a receive output side. The receive input side includes a receive input line configured to receive a remote signal from the phone network. The receive output side includes a receive output line configured to convey the remote signal to a modem. First and second transmit OI modules are provided that each have a transmit input side and a transmit output side. The transmit input sides have transmit input lines joined in parallel with one another and configured to receive transmit signals from the modem. The transmit output sides have transmit output lines joined in parallel with one another and configured to convey the transmit signals to the phone network. An impedance matching module is joined to the transmit output sides of the first and second transmit OI modules and configured to provide impedance matching with the phone network.

Optionally, the transmit output lines from the first and second transmit OI modules may be joined in parallel with the receive input line. The first and second transmit OI modules may include first and second LEDs, respectively, that draw substantially equal diode currents. The receive and first and second transmit OI modules may each have an associated diode current, where the receive module is interconnected with the first and second transmit OI modules such that the diode current collectively utilized by the first and second transmit OI modules changes by an amount that is substantially equal in amplitude, but opposite in polarity, to the diode current utilized by the receive OI module.

Optionally, the receive OI module may be interconnected with the first and second transmit OI modules such that distortion generated by the first and second transmit OI modules is at least partially canceled by the receive OI module.

In accordance with another embodiment, a security alarm system is configured to be joined to a phone network. The security alarm system comprises a security panel for performing control operations associated with at least one of security and emergency functions. A security alarm modem bi-directionally interconnects the security panel with a phone network. A direct access arrangement (DAA) device is provided between the security alarm modem and the phone network. The DAA device comprises a receive optical-isolator (OI) module having a receive input side and a receive output side. Receive input side includes a receive input line configured to receive a remote signal from the phone network. The receive output side includes a receive output line configured to convey the remote signal to a security alarm modem. First and second transmit OI modules are provided that each have a transmit input side and a transmit output side. The transmit input sides have transmit input lines joined in parallel with one another and configured to receive transmit signals from the security alarm modem. The transmit output sides have transmit output lines joined in parallel with one another and configured to convey the transmit signals to the phone network.

Optionally, an impedance matching module may be provided that is joined to the transmit output sides of the first and second transmit OI modules and configured to provide impedance matching with the phone network.

DETAILED DESCRIPTION OF THE INVENTION

Figure 1:
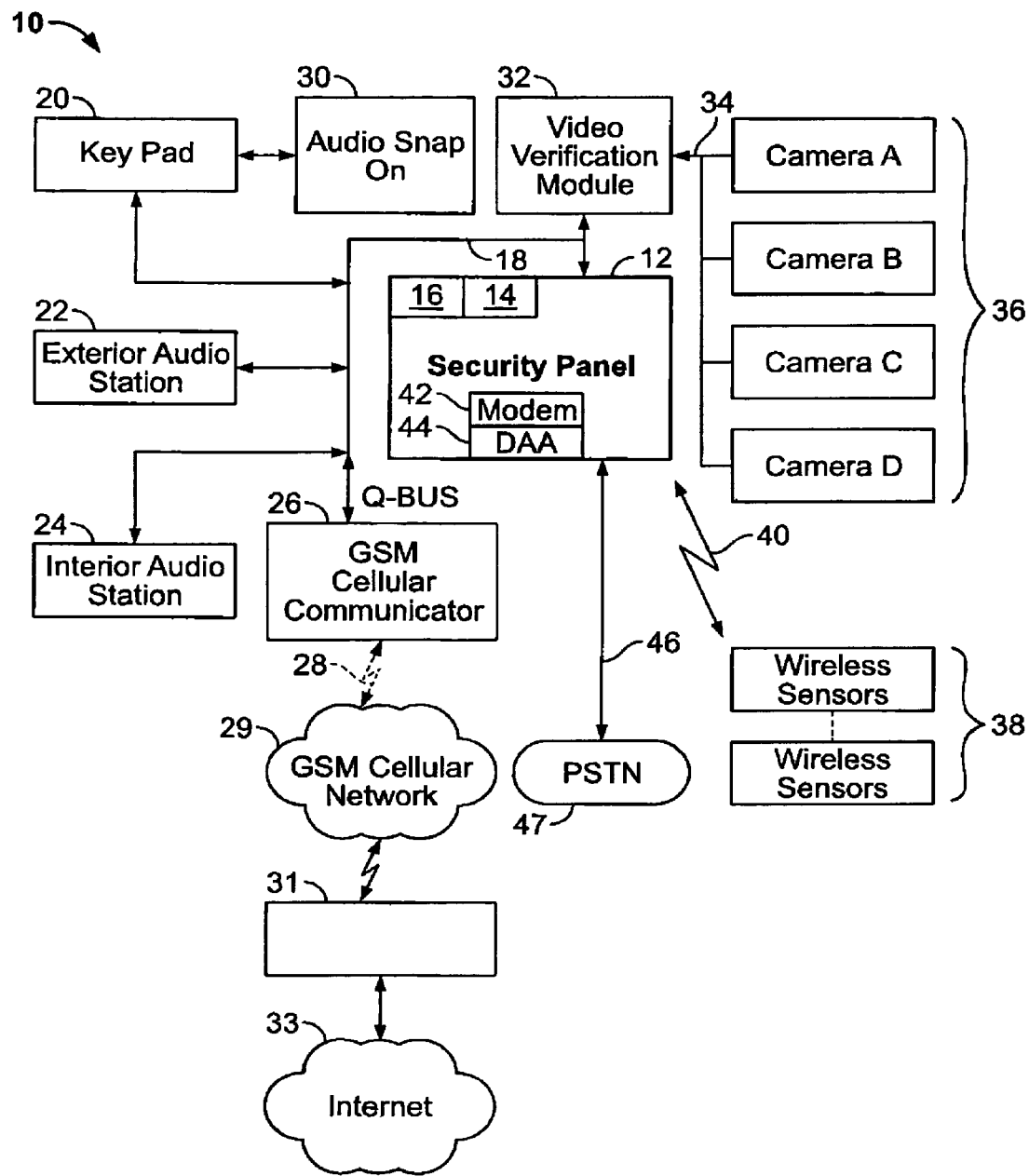
FIG. 1 is a block diagram of a security alarm system formed in accordance with an embodiment of the present invention.

FIG. 1 illustrates a block diagram of a network enabled system, such as a security alarm system 10 that is formed in accordance with an embodiment of the present invention. The system 10 includes a security panel 12 configured to perform various security and emergency related functions. The security panel 12 includes, among other things, a processor module 14, memory 16, modem 42 and DAA 44. The security panel 12 communicates, over a single, common communications bus 18 with various components, such as keypad 20, exterior audio station 22, interior audio station 24, GSM cellular communicator 26, video verification module 32, cameras 36 and the like. As shown in FIG. 1, the modem 42 is a separate component from the processor module 11. Optionally, Optionally, the modem 42 may be part of the processor module 14. As a further option, the module 42 may communicate with the processor module 14 over the bus 18 or over a separate dedicated bus. The number of video cameras 36, key pads 20, exterior audio stations 22, interior audio stations 24, GSM cellular communicators 26, video verification modules 32, modems 42 and wireless sensors 38 may vary. The security panel 12 affords integrated audio and video features through the use of the communications bus 18 which carries control, event and configuration data, as well as audio and video data. Examples of audio and video features include audio intercom, video surveillance, video for intercom, audio verification of the alarm events, video verification of the alarm events and remote access of audio and video data. It is understood that all, or only a portion, of the audio and video features, and components illustrated in FIG. 1, may be provided and/or connected through the bus 18.

The keypad 20 may be joined to an audio snap on component 30 that is capable of capturing audio data from, and outputting audio data to, the bus 18. The exterior audio station 22, interior audio station 24 and keypad 20 (with the audio snap on component 30) are each capable of capturing audio data from, or outputting audio data to, the bus 18. Each of the exterior and interior audio stations 22 and 24, and keypad 20 may be assigned a unique audio channel having a predetermined bandwidth (e.g. 32 kbps). Optionally, the audio data conveyed over the bus 18 may be compressed. The security panel 12 may compress out-going audio data and decompress in-coming audio data. Similarly, one or more of the keypad 20, exterior audio station 22 and interior audio station 24 may perform compression and decompression of audio data received from and conveyed over the bus 18.

The video verification module 32 functions as a video concentrator for multiple video cameras 36 that are joined to the video verification module 32 over communications link 34. The video verification module 32 provides video data over one or more video channels on or to the bus 18. The bandwidth of the video channel or channels may differ from or equal the bandwidth assigned to each audio channel. Video data output from the video verification module 32 may be compressed and conveyed at a bandwidth that is less than or equal to a bandwidth assigned to audio channels. The security panel 12 may also perform compression and decompression of video data. Control, event and configuration data are also conveyed over the bus 18 between the security panel 12 and the key pad 20, exterior audio station 22, interior audio station 24, GSM cellular communicator 26, video verification module 32, and modem 42 (generally denoted as audio and video resources).

Optionally, the processor module 14 may support smart data management of one or more of the video and audio resources in order to minimize the unnecessary use of data bandwidth. For instance, when half duplex audio is desired between two audio stations, one 32 kbps audio channel is established, instead of two such channels. The GSM cellular communicator 26 establishes a wireless link 28 with a GSM cellular network 29 to convey video and audio data to and from the GSM cellular network 29. It is understood that any cellular network may be utilized with the system 10, not necessarily a GSM cellular network. Optionally, the GSM cellular network may include a gateway 31 to the Internet 33, such that the GSM cellular communicator 26 enables the security panel 12 to convey audio and video data bi-directionally to and from the Internet 33.

The system 10 provides full duplex audio operation between audio modules (such as the interior and exterior audio stations 24 and 22, and audio snap on component 30), thereby permitting a user to speak while the speakers at the corresponding audio module are also producing sound. Echo cancellation devicery is provided at each audio module. During the alarm events, all audio modules are operated in a receive mode only. The processor module 14 manages the bus 18 to reserve sufficient bandwidth for audio verification functions to avoid problems even when all audio channels are being sampled. The security panel 12 performs audio verification to verify whether an alarm condition is real. Optionally, the security panel 12 may afford remote audio capabilities when a cellular communicator or an IP communicator is joined to the network supported by the GSM cellular communicator 26.

The video verification module 32 provides an output source for all video data received by the cameras 36 and verifies alarm conditions identified from the video data. The video verification module 32 may include one or more display units, one or more keypads equipped with color LCD displays and the like. The cameras 36 capture pictures, still images, live video and the like and convey such information, collectively, as video data to the video verification module 32. Optionally, the cameras 38 may have, co-located therewith, one or more display units, one or more keypads equipped with color LCD displays and the like. The displays at the video verification module 32 and/or at the cameras 32 display the captured video data. Optionally, remote video may be supported in a manner similar to the support of remote audio.

The security panel 12 is also joined to wireless sensors 38 through a wireless link 40. The wireless link 40 may represent an RF link, an IR link and the like. Modem 42, within security panel 12, is joined to a direct access arrangement (DAA) device 44 which is, in turn, interconnected over phone lines 46 with the phone network 48. Voice and data are conveyed through the modem 42, DAA device 44 and phone lines 46 bi-directionally.

Figure 2:
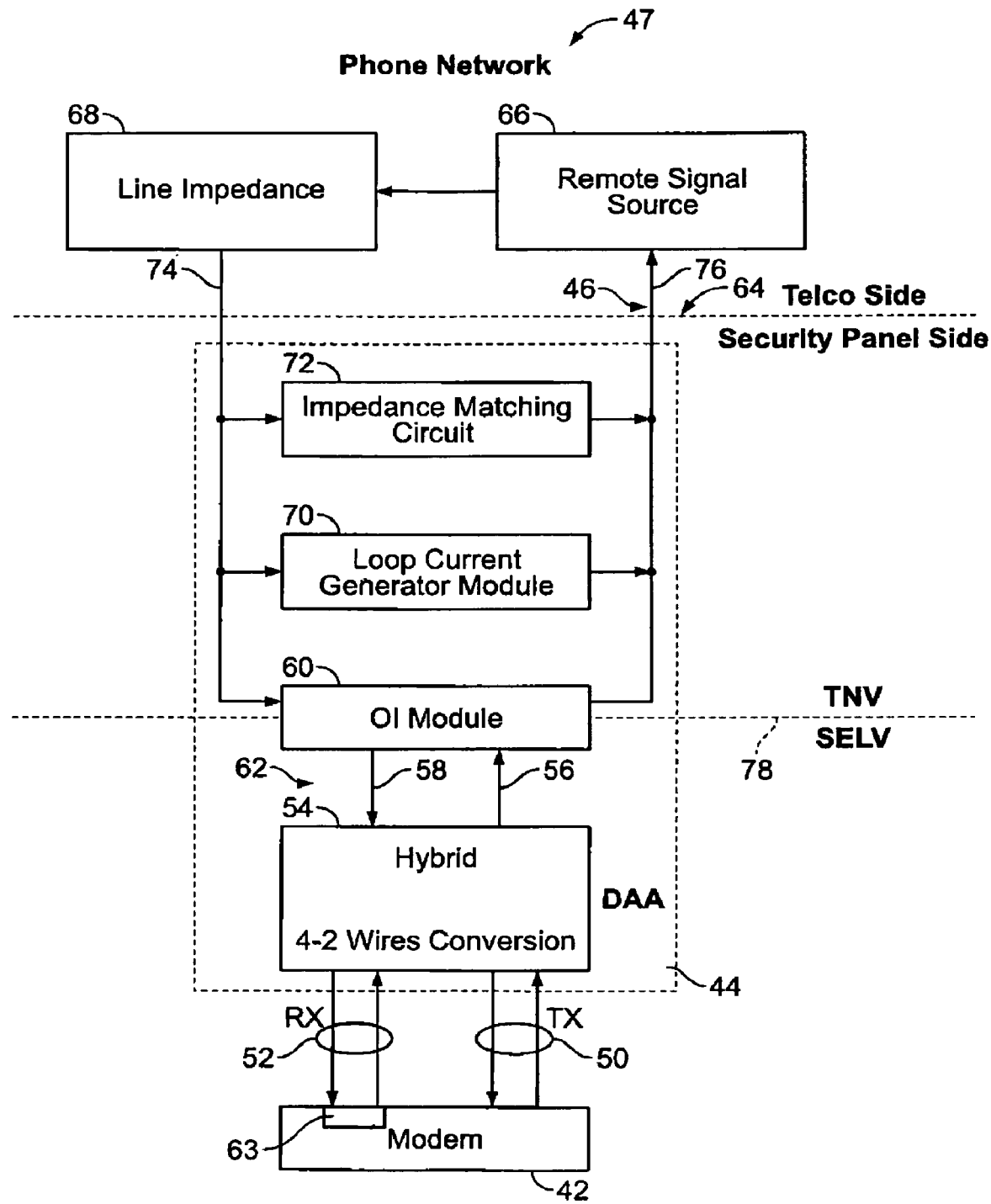
FIG. 2 is a block diagram of a system connection between a phone network and a security panel modem in accordance with an embodiment of the present invention.

FIG. 2 illustrates a block diagram of a system connection between the phone network 47 and security panel modem 42. The modem 42 is joined with the DAA device 44 over a transmit line pair 50 and a receive line pair 52. The transmit and receive line pairs 50 and 52 are passed to a 4:2 wire conversion hybrid module 54 that merges transmit and receive signals from the transmit and receive line pairs 50 and 52 onto a single pair with one as reference and either line 56 and line 58 carrying both transmit and receive signals. The transmit line 56 and receive line 58 interconnect the hybrid module 54 and an optical isolator (OI) module 60. For reasoned explained below, the receive line 58 contains both transmit and receive signals.

The modem 42 decodes the receive signal received over the receive line pair 52 by removing the transmit signal therefrom. The modem 42 includes a linear adaptive filter 63 which operates to remove the echo of the transmit signal. The adaptive filter 63 is configured primarily to cancel echoes constituting linear combinations of the transmit signal that is conveyed out over transmit line 56. The linear adaptive filter 63 is not as well suited to cancel echoes constituting nonlinear residual or distorted transmit signals that also echo back over the receive line 56. By way of example, such nonlinear residual signals may represent harmonic signals of the fundamental frequency of the transmit signal, where such harmonic signals coincide with the passband of a filter configured to pass the receive signal. For example, second harmonics of the fundamental frequency of the transmit signal may be difficult to remove in linear adaptive filters. As explained below in more detail, the OI module 60 is constructed to substantially cancel out nonlinear residual echo signals within the received signal echoed back over received line 58.

The DAA device 44 includes a modem interface 62 that extends between the OI module 60 and hybrid module 54. The DAA device 44 also includes a telecom interface 64 that extends between the DAA device 44 and the phone network 47. In the example of FIG. 2, the phone network 47 is illustrated conceptually to include a remote signal source 66 and line impedance 68. The DAA device 44 includes a loop current generator module 70 and an impedance matching device 72. Phone lines 74 and 76 interconnect the phone network 47 with the DAA device 44. The impedance matching device 72, loop current generator module 70 and OI module 60 are interconnected in parallel with one another and are each joined in series between phone line 74 and phone line 76. The OI module 60 provides an isolation barrier 78 between the phone network 47 and modem 42.

Figure 3:
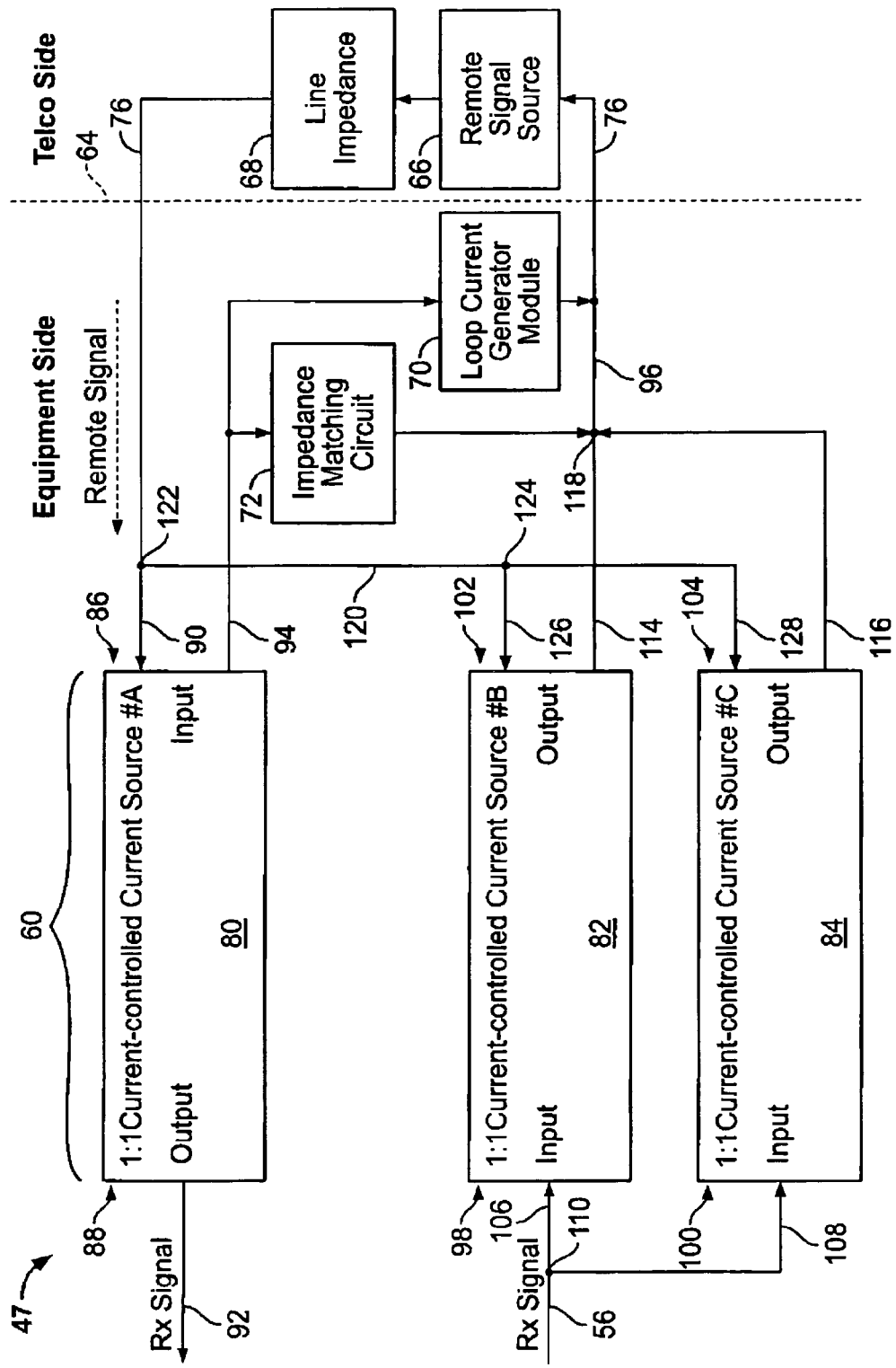
FIG. 3 is a block diagram of a direct access arrangement device formed in accordance with an embodiment of the present invention.

FIG. 3 illustrates a detailed block diagram of a portion of the DAA device 44 to better show the OI module 60, the loop current generator module 70 and impedance matching device 72. The telecom interface 64 separates the remote signal source 66 and phone line impedance 68 from the OI module 60. The OI module 60 includes a receive OI module 80 that is connected in parallel with a pair of transmit OI modules 82 and 84. The receive and transmit OI modules 80, 82 and 84 form a opt-isolator arrangement, with a dual parallel transmit stage. The receive OI module 80 includes a receive input side 86 and a receive output side 88. The receive input side 86 includes a receive input line 90 that is configured to receive a remote signal from the phone network 47. The receive output side 88 includes a receive output line 92 that is configured to convey the remote signal (after being isolated) over received line 58 (FIG. 2) to the modem 42 (FIG. 2). The receive input side 86 also includes a return line 94 that is joined to the impedance matching device 72 and the loop current generator module 70. Outputs from the impedance matching device 72 and loop current generator module 70 are provided onto a return line 96 that is attached to the phone line 76.

The transmit OI modules 82 and 84 form the dual parallel transmit stage. Each of the transmit OI modules 82 and 84 include a transmit input side 98 and 100, and a transmit output side 102 and 104. The transmit input sides 98 and 100 have transmit input lines 106 and 108 joined at node 110 in parallel with one another. The transmit input lines 106 and 108 are joined to the transmit line 56 and operate to divide in half the current conveyed over the transmit line 56. The transmit output sides 102 and 104 have transmit output lines 114 and 116 that are joined at node 118 with the return line 96. The transmit output lines 114 and 116 are joined in parallel and are configured to convey transmit signals to the phone network 47. The transmit output sides 102 and 104 are joined, through current divider 120 at node 122 with receive input line 90. The current divider 120 is split at node 124 to form inputs 126 and 128 to the transmit output sides 102 and 104 of the transmit OI modules 82 and 84, respectively.

Optionally, only a single transmit OI module may be used, and interconnected in parallel with the receive OI module, such that distortion may be cancelled. Alternatively, three or more transmit OI modules may be joined in parallel. Using two or more transmit OI modules reduces the DC output current of each module for any given DC drive level.

Joining the receive and transmit OI modules 80, 82 and 84 in parallel substantially cancels harmonics, and particularly the second harmonic, of the fundamental frequency of the transmit signal. Joining the receive and transmit OI modules 80, 82 and 84 in parallel facilitates equalization of current flow, such that current changes at the output side of the transmit OI modules 82 and 84 cause current changes at the input side of the receive OI module 80 that are equal in amplitude, but opposite in polarity.

The receive and transmit OI modules 80, 82 and 84 operate as 121 current controlled current sources, whereby a current produced at the output side is at least linearly proportional to the current conveyed at the input side. Thus, for example, the current output from receive output line 92 is linearly proportional to the current passed between the receive input line 90 and the return line 94. Similarly, the current output over transmit output lines 114 and 116 are linearly proportional to the current input at transmit input lines 106 and 108, respectively. The DAA device 44 provides good signal quality for receive signals (from the phone network) by reducing signal distortion. As the distortion is reduced, the receive signal sensitivity is increased. By reducing distortion, the system 10 remains reliable even at low receive signal levels (e.g., −23.5 dBm for an average US line and −34 dBm for poor US line).

Figure 4:
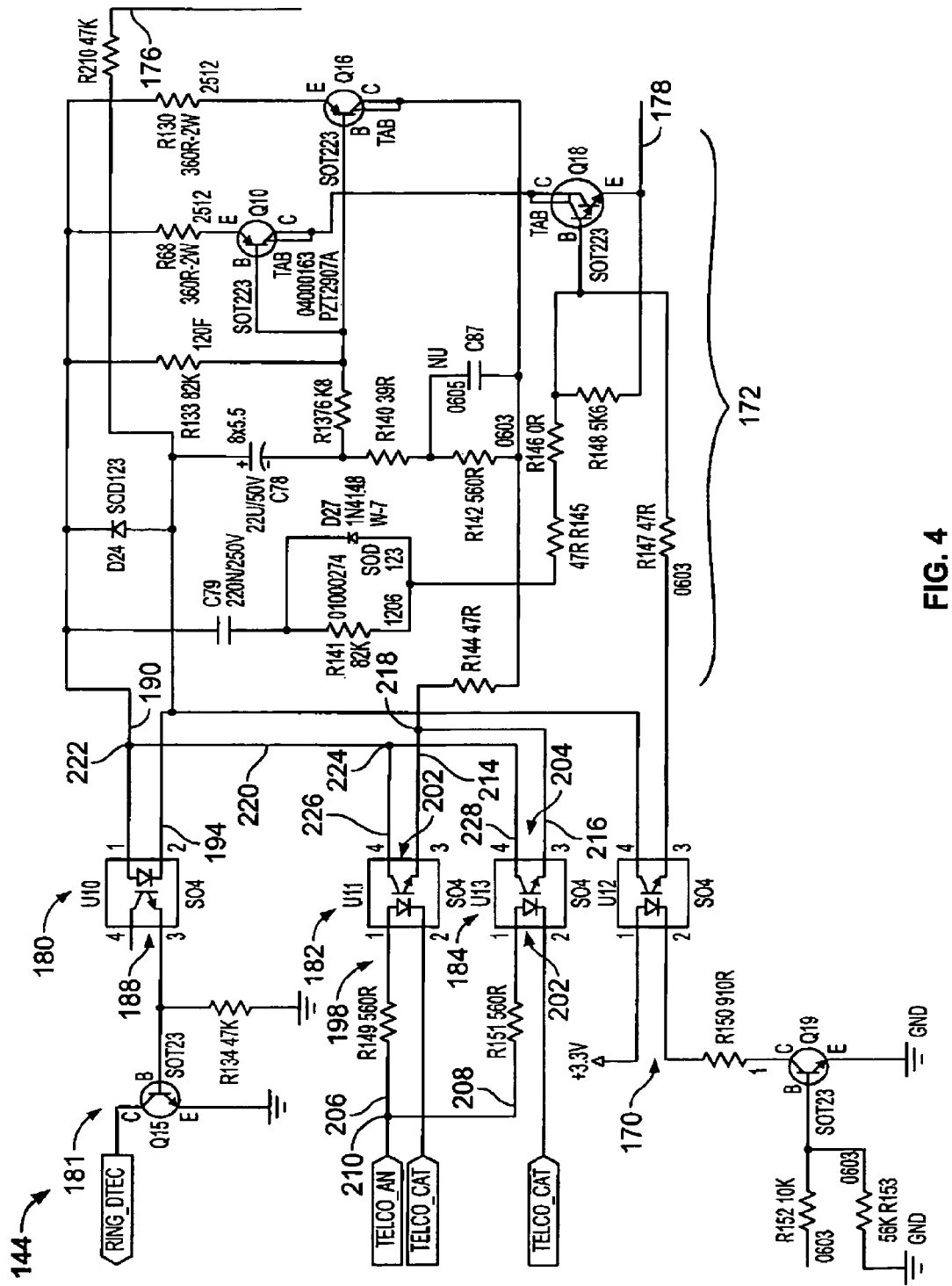
FIG. 4 is a schematic diagram of a DAA device formed in accordance with an embodiment of the present invention.

FIG. 4 illustrates a schematic diagram of a DAA device 144 that is formed in accordance with an embodiment of the present invention. The DAA device 144 is joined to phone lines 176 and 178. The phone line 176 conveys the remote signal to the DAA device 144. The phone line 178 conveys a transmit signal from the DAA device 144 to the phone network. The DAA device 144 includes an impedance matching device 172, a loop current generator module 170, a receive OI module 180, and a pair of transmit OI modules 182 and 184. The loop current generator module 170, receive OI module 180, and transmit OI modules 182 and 184 constitute optical isolators, that each contain a light emitting diode (LED) and photosensitive transistor. The loop current generator module 170, receive OI module 180, and transmit OI modules 182 and 184 may be formed as integrated or discrete components. In the example of FIG. 4, the loop current generator module 170, receive OI module 180, and transmit OI modules 182 and 184 are schematically represented as discrete components that are labeled U12, U10, U11, and U13, respectively. The impedance matching module 172 is schematically represented as a configuration of resistors, diodes, capacitors and transistors, each of which is denoted with an R, D, C or Q label, respectively, followed by a unique number. The following discussion of the components in FIG. 4 will use some, but not all of these unique labels.

Each of the transmit OI modules 182 and 184 includes a transmit input side 198 and 200 (also referred to as the "diode-side"), and a transmit output side 202 and 204 (also referred to as the "transistor-side"). The transmit input sides 198 and 200 have transmit input lines 206 and 208 joined at node 210 in parallel with one another. The transmit input lines 206 and 208 are joined to the transmit line 56 (FIG. 2) and operate to divide in half the current conveyed over the transmit line 56. The transmit output sides 202 and 204 have transmit output lines 214 and 216 that are joined at node 218 with the return line 96. The transmit output lines 214 and 216 are joined in parallel and are configured to convey transmit signals to the phone network. The transmit output sides 202 and 204 are joined, through current divider 220 at node 222 with receive input line 190. The current divider 220 is split at node 224 to form inputs 226 and 228 to the transmit output sides 202 and 204 of the transmit OI modules 182 and 184, respectively.

A ring detection device 181 is provided proximate the receive output side 188. The receive OI module 180 is joined to receive input line 190 and return line 194. The return line 194 is joined at node 222 to current divider 220.

The receive and transmit OI modules 180, 182 and 184, each include a light emitting diode (LED) that is located proximate a photosensitive transistor. Current is supplied through the LED in receive 10 module 180 in through receive input line 190 and out through return line 194. As the current varies, the brightness of the LED varies proportionally. The transistor in the receive OI module 180 adjusts its conductivity based on the amount of exposed light. As the light from the LED increases, the current flow passed by the transistor increases linearly. The LEDs and transistors in the transmit OI modules 182 and 184 operation in a similar manner. The current received by each transmit OI module 182 and 184 on transmit input lines 206 and 208, respectively, determines the amount of current to be passed at the transmit output sides 202 and 204.

Next, the operation of the DAA device 144 will be described. Current through the diode-side of optical isolator U11 is roughly equal to the current through the diode-side of optical isolator U13. When the current through the transistor-side of optical isolator U11 or optical isolator U13 changes, the current through the diode-side of optical isolator U10 changes by the same amount or amplitude, but with opposite polarity. When the current increases through the diode in optical isolator U11 or in optical isolator U13, the voltage waveform across the TIP and RING lines expands in the negative direction.

Expanding the voltage waveform across the TIP and RING lines in the negative direction causes the current through the diode-side of optical isolator U10 to decrease and the voltage waveform at the transistor-side of optical isolator U10 to compress in the positive direction. The expansion and compression of the voltage waveform at the optical isolators U11, U13 and U10 are due to the current transfer ratio characteristic of the optical isolator. However, the expansion and compression of the voltage waveforms at the optical isolators U11, U13 and U10 may be made equal. When the expansion and compression of the voltage waveforms at the optical isolators U11, U13 and U10 are made equal, the net effect is that an undistorted signal is produced at the transistor-side of optical isolator U10, relative to the transmit signal supplied to the transmit input side 198 of the optical isolator U11 or U13.

As used throughout, the term distortion refers to non-linear residual signals and/or harmonic signals that are formed from, and based on, the fundamental frequency of the transmit signal that is conveyed to the diode-side of the optical isolators U11 and U13. As transmit signals are passed through the optical isolators U11 and U13, the isolated transmit signals produced on transmit output lines 214 and 216 include non-linear signal components that cause increases at certain harmonics of the fundamental frequency of the transmit signal.

If not cancelled, the distortion in the isolated transmit signal at lines 214 and 216 will be conveyed back through the optical isolator U10 as an "echo" signal on the receive line 58 to the modem 42 (FIG. 2). The modem 42 is able to remove echo signals that are linearly related to the transmit signal as the modem 42 retains a record of the transmit signal. However, the modem 42 experiences more difficulty in removing distortion within the echo signal as the modem 42 is unable to predict the nature of the distortion.

When the current transfer ratio is different at different DC biasing current levels, it may be desirable to keep the diode current of optical isolators U11, U13 and U10 substantially the same so that the amount of expansion in the voltage waveform can cancel the amount of compression in the voltage waveform. By utilizing a pair of transmit optical isolators U11 and U13 in parallel, the embodiment of FIG. 4 avoids carrying roughly double an amount of current in one transmit optical isolator as the current that is carried in the receive optical isolator U10. It is desirable to supply roughly double an amount of current from the parallel transmit optical isolators U11 and U13, as from the receive optical isolator U10, because of the use of the impedance matching module 170. By way of example, the line impedance may be 600 Ohms. Thus, the impedance of the impedance matching module 170 would also be 600 Ohms. During a transmit operation, the transmit optical isolators U11 and U13 must drive not only the 600 Ohm line impedance but also the 600 Ohm matched impedance of the DAA device 144.

The current change at optical isolator U10 only goes through the impedance matching module 170, which includes resistors R140 and R142. Using two parallel-connected optical isolators U11 and U13 of the same type is a simple method for equalizing the current through optical isolators U11, U13 & U10.

Mathematically, by applying a first degree of approximation, it is possible to treat a small section of the current ratio curve for the optical isolators as linear. Assuming a fixed current level at a gain of one for optical isolators U11, U13 and U10, the system may be expressed by the following. $\Delta x$ represents the input current variation from the DC bias point of optical isolators U11 and U13. $\Delta k$ is the change in current transfer ratio K for optical isolators U11 and U13. Linearity states that: (C is a constant).

$$\frac{\Delta k}{\Delta x} = C$$

Assuming K=1, the output that corresponds to $\Delta x$ is:

$$\Delta y = \Delta x(1 + C\Delta x) = \Delta x + C\Delta x^2$$

So, the output current of U11 and U13 is distorted by the second order term $C\Delta x^2$. $\Delta y$ also causes the current through U10 to fall or rise by exactly the same amount.

The output that corresponds to $\Delta y$ is:

$$\Delta z = -\Delta x(1 + C\Delta x)[1 - C\Delta x(1 + C\Delta x)]$$
$$= (-\Delta x - C\Delta x^2)(1 - C\Delta x - C^2\Delta x^2)$$
$$= -\Delta x + C\Delta x^2 - C\Delta x^2 + C^2\Delta x^3 + C^2\Delta x^3 + C^3\Delta x^4$$
$$= \Delta x + 2C^2\Delta x^3 + C^3\Delta x^4$$

It is clear that the second order term is completely canceled leaving the higher order terms that are smaller in size, therefore causing less distortion.

By using two parallel-connected optical isolators in the signal output path, the net current change in each of the input and output optical isolators may be tuned to be exactly the same. A large amount of distortion that is caused by the non-constant current transfer ratio of the optical isolators is, therefore, canceled. By way of example only, at a signal output level of −11.2 dBm, the embodiment of FIG. 4 allows error-free receive signal level down to −30 dBm in modem calling mode. At these output transmission levels, the embodiment of FIG. 4 exhibited about 11 to 12 dBm input sensitivity improvement.

The following results were obtained with the prior art device tuned with transmit opto-diode current of 5.89 mA, a driving resistor value of 560 Ohm and receive opto-diode current of roughly 1.9 mA. The transmit echo level was also tuned to the minimum possible level.

| TX Signal Level | Lowest RX Signal Level |
|---|---|
| −28 dBm | −40 dBm |
| −18.6 dBm | −32 dBm |
| −10 dBm | −18 dBm |

The following result was obtained with the prior art device tuned with transmit opto-diode current of 4.02 mA, a driving resistor value of 820 Ohm and receive opto-diode current of roughly 2.09 mA. The transmit echo level was left unchanged from the previous measurement.

| TX Signal Level | Lowest RX Signal Level |
|---|---|
| −10 dBm | −21 dBm |

The following result was obtained with the embodiment of FIG. 4 without optimizing the transmit echo level.

| TX Signal Level | Lowest RX Signal Level |
|---|---|
| −10 dBm | −24 dBm |

The following result was obtained with the embodiment of FIG. 4 and with the transmit echo level optimized.

| TX Signal Level | Lowest RX Signal Level |
|---|---|
| −11.2 dBm | −30 dBm |

Figure 5:
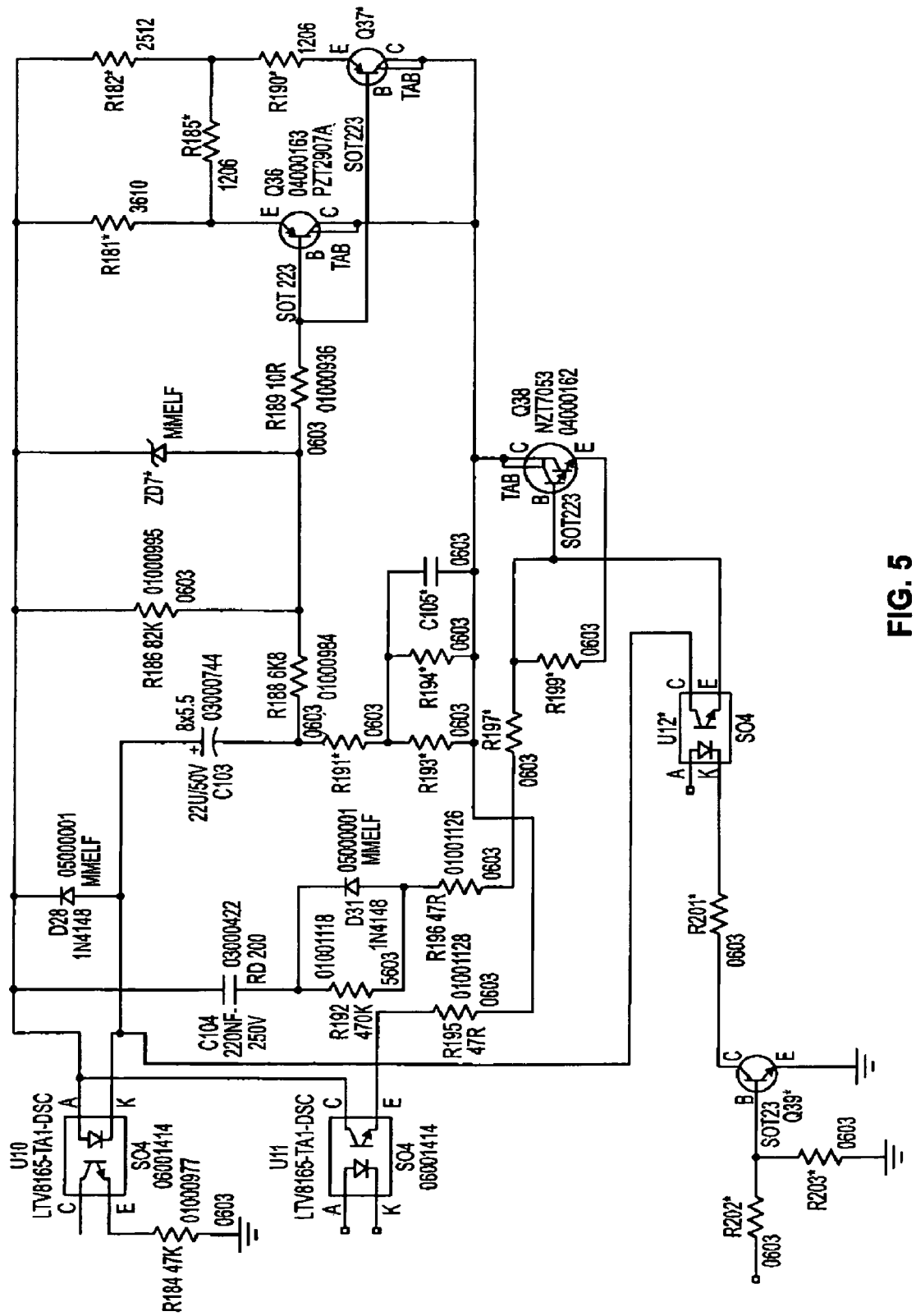
FIG. 5 illustrates a schematic diagram of a DAA device formed in accordance with an alternative embodiment.

FIG. 5 illustrates a schematic diagram of a DAA Device formed in accordance with an alternative embodiment. In FIG. 5, only a single transmit OI module V11 is used and joined in parallel with a single OI receive module V10.

Embodiments of the present invention reduce the distortion from transmission echo, thereby increasing the signal to noise ratio for the received signal. Certain embodiments of the present invention provided an open-loop arrangement, which cancels the intrinsic distortion introduced by lower cost optical isolators. By way of example only, at least one embodiment of the present invention may provide a 12 dBm lower distortion level. By way of example only, at least one embodiment of the present invention allows reliable V.22 bis modem calling and answering operations down to a receive signal level of −30 dBm for typical phone signal transmission levels.

Optionally, the DC biasing current through the opto-isolators may be tuned further using different resistors combinations.

In certain examples described above, the DAA devices are explained in connection with a security panel system. However, the present invention is not limited to applications utilizing security panel systems. The video verification module 32 may include one or more display units, one or more keypads equipped with color LCD displays and the like. Instead, the DAA devices formed in accordance with embodiments of the present invention may be utilized with other applications. For instance, the DAA device may be utilized to connect a modem to the public switched telephone network (PSTN), where the modem is used to interconnect the PSTN system to various voice and/or data network enabled equipment, such as a facsimile machine, a home computer, an office computer, a server, a scanner and the like.

Figure 6:
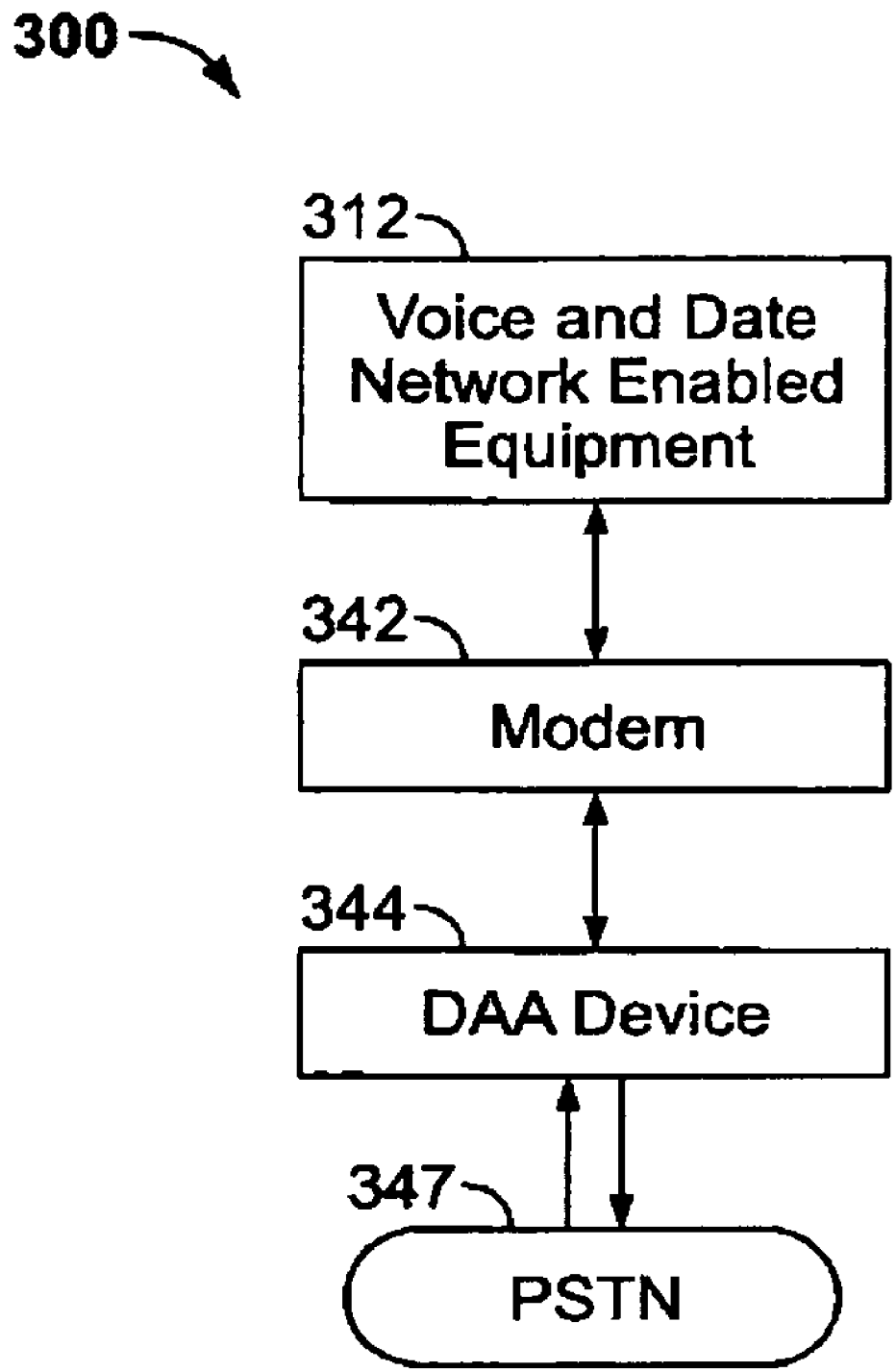
FIG. 6 illustrates a data communications system formed in accordance with an alternative embodiment.

FIG. 6 illustrates a data communications system 300 formed in accordance with an alternative embodiment. The system 300 includes a DAA 344 that interconnects a modem 342 with a phone network 347. The modem 342 is joined to voice and/or data network enabled equipment 312, such as facsimile machine, a home computer, an office computer, a server, a scanner and the like. The DAA device 344 is constructed, and operates, in a manner similar to the DAA devices described in connection with FIGS. 1-5. The equipment 312 transmits voice and/or data over the PSTN network 347 and receives voice and/or data from the PSTN network 347.

While the invention has been described in terms of various specific embodiments, those skilled in the art will recognize that the invention can be practiced with modification within the spirit and scope of the claims.

What is claimed is:

1. A direct access arrangement (DAA) device configured to interface a modem with a phone network, the DAA device comprising:

a receive optical isolator (OI) module having a receive input side and a receive output side, the receive input side including a receive input line configured to receive a remote signal from the phone network, the receive output side including a receive output line configured to convey the remote signal to a modem;

a first and second transmit OI modules each having a transmit input side and a transmit output side, the transmit input sides having transmit input lines joined in parallel with one another and configured to receive transmit signals from the modem, the transmit output sides having transmit output lines joined in parallel with one another and configured to convey the transmit signals to the phone network, wherein the receive OI module is interconnected with the first and second transmit OI modules such that distortion generated by the first and second transmit OI modules is at least partially canceled by the receive OI module; and an impedance matching module joined to the transmit output sides of the first and second transmit OI modules and configured to provide impedance matching with the phone network.

2. The DAA device of claim 1, wherein the transmit output lines from the first and second transmit OI modules are joined in parallel with the receive input line.

3. The DAA device of claim 1, wherein the first and second transmit OI modules include first and second LEDs, respectively, that draw substantially equal diode currents.

4. The DAA device of claim 1, wherein the receive and first and second transmit OI modules each have an associated diode current, the receive module being interconnected with the first and second transmit OI modules such that the diode current collectively utilized by the first and second transmit OI modules changes by an amount that is substantially equal, but opposite, to the diode current utilized by the receive OI module.

5. The DAA device of claim 1, wherein the receive and first and second transmit OI modules block common mode signals and pass differential mode signals in the remote and transmit signals.

6. The DAA device of claim 1, wherein the impedance matching module is joined in parallel with the transmit output lines of the first and second transmit OI modules and is interconnected between the transmit output lines of the first and second transmit OI modules and the input side of the receive OI module.

7. A direct access arrangement (DAA) device configured to interface a modem with a phone network, the DAA device comprising:

a receive optical isolator (OI) module having a receive input side and a receive output side, the receive input side including a receive input line configured to receive a remote signal from the phone network, the receive output side including a receive output line configured to convey the remote signal to a modem;

a first and second transmit OI modules each having a transmit input side and a transmit output side, the transmit input sides having transmit input lines joined in parallel with one another and configured to receive transmit signals from the modem, the transmit output sides having transmit output lines joined in parallel with one another and configured to convey the transmit signals to the phone network, wherein the transmit signals include harmonic signal components, the receive input side of the receive OI module is joined in parallel with the transmit receive sides of each of the first and second transmit OI modules to at least partially canceled the harmonic signal components of the transmit signals; and an impedance matching module joined to the transmit output sides of the first and second transmit OI modules and configured to provide impedance matching with the phone network.

8. A direct access arrangement (DAA) device configured to interface a modem with a phone network, the DAA device comprising:

a receive optical isolator (OI) module having a receive input side and a receive output side, the receive input side including a receive input line configured to receive a remote signal from the phone network, the receive output side including a receive output line configured to convey the remote signal to a modem;

a first and second transmit OI modules each having a transmit input side and a transmit output side, the transmit input sides having transmit input lines joined in parallel with one another and configured to receive transmit signals from the modem, the transmit output sides having transmit output lines joined in parallel with one another and configured to convey the transmit signals to the phone network, wherein the transmit signals include non-linear residual components, the receive input side of the receive OI module is joined in parallel with the transmit receive sides of each of the first and second transmit OI modules to at least partially canceled the nonlinear residual components of the transmit signals; and an impedance matching module joined to the transmit output sides of the first and second transmit OI modules and configured to provide impedance matching with the phone network.

9. A data communications network enabled system configured to be joined to a phone network, the system, comprising:

network enabled equipment configured to receive and transmit at least one of voice and data over a phone network;

a modem interconnecting the equipment with a phone network; and a direct access arrangement (DAA) device provided between the modem and the phone network, the DAA device comprising:

a receive optical isolator (OI) module having a receive input side and a receive output side, the receive input side including a receive input line configured to receive a remote signal from the phone network, the receive output side including a receive output line configured to convey the received signal to the security alarm modem; and first and second transmit OI modules each having a transmit input side and a transmit output side, the transmit input sides having transmit input lines joined in parallel with one another and configured to receive transmit signals from the modem, the transmit output sides having transmit output lines joined in parallel with one another and configured to convey the transmit signals to the phone network, wherein the receive OI module is interconnected with the first and second transmit OI modules such that distortion generated by the first and second transmit OI modules is at least partially canceled by the receive OI module.

10. The system of claim 9, further comprising an impedance matching module joined to the transmit output sides of the first and second transmit OI modules and configured to provide impedance matching with the phone network.

11. The system of claim 9, wherein the transmit output lines from the first and second transmit OI modules are joined in parallel with the receive input line.

12. The system of claim 9, wherein the first and second transmit OI modules include first and second LEDs, respectively, that draw substantially equal diode currents.

13. The system of claim 9, wherein the receive and first and second transmit OI modules each have an associated diode current, the receive module being interconnected with the first and second transmit OI modules such that the diode current collectively utilized by the first and second transmit OI modules changes by an amount that is substantially equal, but opposite, to the diode current utilized by the receive OI module.

14. The system of claim 9, wherein the impedance matching module is joined in parallel with the transmit output lines of the first and second transmit OI modules and is interconnected between the transmit output lines of the first and second transmit OI modules and the input side of the receive OI module.

15. The system of claim 9, wherein the equipment constitutes at least one of a security alarm system, a fire alarm system, a facsimile machine, a home computer, an office computer, a server, and a scanner.

16. The system of claim 9, wherein the equipment constitutes a security panel for performing control operations associated with at least one of security and emergency functions and the modem constitutes a security alarm modem interconnecting the security panel with the phone network.

17. The system of claim 16, further comprising at least one of keypad, video cameras, wireless or wired sensors, a GSM cellular communicator, interior audio stations, and exterior audio stations providing at least one of security and emergency information to the security panel.

18. The system of claim 16, wherein the security panel conveys data through the security alarm modem and the DAA device to the phone network.

19. The system of claim 16, wherein the security panel receives data from the phone network through the security alarm modem and DAA device.

20. A data communications network enabled system configured to be joined to a phone network, the system, comprising:

network enabled equipment configured to receive and transmit at least one of voice and data over a phone network;

a modem interconnecting the equipment with a phone network; and a direct access arrangement (DAA) device provided between the modem and the phone network, the DAA device comprising:

a receive optical isolator OI module having a receive input side and a receive output side, the receive input side including a receive input line configured to receive a remote signal from the phone network, the receive output side including a receive output line configured to convey the received signal to the security alarm modem; and first and second transmit OI modules each having a transmit input side and a transmit output side, the transmit input sides having transmit input lines joined in parallel with one another and configured to receive transmit signals from the modem, the transmit output sides having transmit output lines joined in parallel with one another and configured to convey the transmit signals to the phone network, wherein the transmit signals include non-linear residual components, the receive input side of the receive OI module is joined in parallel with the transmit receive sides of each of the first and second transmit OI modules to at least partially canceled the nonlinear residual components of the transmit signals.

21. A direct access arrangement (DAA) device configured to interface a modem with a phone network, the DAA device comprising:

a receive optical isolator (OI) module having a receive input side and a receive output side, the receive input side including a receive input line configured to receive a remote signal from the phone network, the receive output side including a receive output line configured to convey the remote signal to a modem;

at least two transmit OI modules each having a transmit input side and a transmit output side, the transmit input sides having transmit input lines joined in parallel with one another and configured to receive transmit signals from the modem, the transmit output sides having transmit output lines joined in parallel with one another and configured to convey the transmit signals to the phone network, wherein the receive OI module is interconnected with the first and second transmit OI modules such that distortion generated by the first and second transmit OI modules is at least partially canceled by the receive OI module; and an impedance matching module joined to the transmit output sides of the first and second transmit OI modules and configured to provide impedance matching with the phone network.

* * * * *